United States Patent
Soman et al.

(10) Patent No.: US 10,210,326 B2
(45) Date of Patent: Feb. 19, 2019

(54) USB STACK ISOLATION FOR ENHANCED SECURITY

(71) Applicant: VMware, Inc., Palo Alto, CA (US)

(72) Inventors: Sisimon Soman, Sunnyvale, CA (US); Matt Conover, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 223 days.

(21) Appl. No.: 15/187,733

(22) Filed: Jun. 20, 2016

(65) Prior Publication Data
US 2017/0364677 A1    Dec. 21, 2017

(51) Int. Cl.
| | |
|---|---|
| *G06F 21/53* | (2013.01) |
| *G06F 21/57* | (2013.01) |
| *G06F 9/455* | (2018.01) |
| *G06F 21/85* | (2013.01) |

(52) U.S. Cl.
CPC .......... *G06F 21/53* (2013.01); *G06F 9/45558* (2013.01); *G06F 21/57* (2013.01); *G06F 21/85* (2013.01); *G06F 2009/45575* (2013.01); *G06F 2009/45579* (2013.01); *G06F 2009/45587* (2013.01); *G06F 2221/2105* (2013.01)

(58) Field of Classification Search
CPC .......... G06F 21/53; G06F 21/85; G06F 21/57; G06F 9/45558; G06F 2009/45575; G06F 2221/2105
See application file for complete search history.

(56) References Cited

U.S. PATENT DOCUMENTS

| | | | | |
|---|---|---|---|---|
| 8,302,094 B2* | 10/2012 | Rogel | ................. | G06F 9/45533 710/37 |
| 8,327,137 B1* | 12/2012 | Erb | ........................ | G06F 21/53 713/164 |
| 8,370,835 B2* | 2/2013 | Dittmer | ............... | G06F 9/45558 711/115 |
| 9,785,771 B1* | 10/2017 | Pratt | ..................... | G06F 21/554 |
| 2003/0140191 A1* | 7/2003 | McGowen | .......... | G06F 11/2005 710/302 |
| 2006/0288165 A1* | 12/2006 | Rosenbloom | ........... | H04L 67/06 711/115 |
| 2007/0011264 A1* | 1/2007 | Rosenbloom | ......... | G06F 13/385 709/217 |

(Continued)

OTHER PUBLICATIONS

"Mac OSX: What is the safest way to access an unknown USB storage", Mar. 29, 2015, from Information Security Stack Exchange, retrieved online from <https://web.archive.org/web/20150329211938/https://security.stackexchange.com/questions/64404/mac-osx-what-is-the-safest-way-to-access-an-unknown-usb-storage>, retrieved on Mar. 13, 2018.*

(Continued)

*Primary Examiner* — Farid Homayounmehr
*Assistant Examiner* — Zhimei Zhu (57) ABSTRACT

Disclosed is a computer and method in a computer that detects attachment of an external device. A determination may be made whether the external device is trusted or untrusted. When the external device is deemed to be trusted, a first device stack may be instantiated in a first OS executing on the computer to conduct interactions with the external device. When the external device is deemed to be untrusted, a second device stack may be instantiated in a second OS executing on the computer to conduct interactions with the external device.

20 Claims, 10 Drawing Sheets

(56) References Cited

U.S. PATENT DOCUMENTS

| | | | |
|---|---|---|---|
| 2007/0204265 A1* | 8/2007 | Oshins | G06F 9/45558 |
| | | | 718/1 |
| 2013/0014221 A1* | 1/2013 | Moore | G06F 21/85 |
| | | | 726/3 |
| 2015/0120779 A1* | 4/2015 | Lin | H04L 67/1095 |
| | | | 707/783 |
| 2016/0306963 A1* | 10/2016 | Austin | G06F 21/53 |

OTHER PUBLICATIONS

"Connecting VMs to external usb device", Oct. 31, 2015, obtained online from <https://web.archive.org/web/20151031062159/https://ask.openstack.org/en/question/79341/connecting-vms-to-external-usb-device/>, retrieved on Oct. 16, 2018.*

Branscombe, Mary; "Will Windows 10 mean the end of malware"; www.techradar.com; Nov. 30, 2014, 10 pages.

* cited by examiner

USB STACK ISOLATION FOR ENHANCED SECURITY

BACKGROUND

Attacks using malicious USBs (so called BadUSB attacks) are on the rise. USB devices can operate by providing their own firmware (device drivers), which the host installs in its memory and is executed by the host OS. A malicious USB device may be configured with a malicious device driver, which when installed in the host can compromise the security of the host. For example, the malicious USB device may emulate a keyboard and inject keystrokes as if entered by a logged-in user, thus allowing for various attacks; for example, malware may be downloaded and installed on the host. The malicious USB device may directly access (read, write, delete) files on the host, monitor or otherwise affect network activity, spoof a network card and change the host's DNS settings to redirect network traffic, and so on. This form of attack, however, is not necessarily limited to USB-type devices. Any hardware device that can be plugged into the host and provides firmware to the host can in principle be made malicious. Such devices include but are not limited to SCSI devices, FireWire devices, and so on.

Microsoft introduced a virtual secure mode (VSM) feature in their Windows 10™ operating system. VSM is a protected container (virtual machine) that executes on the virtualization component of a Windows 10™ host. The VSM does not allow any third-party code to be executed in the VSM space. Since the Windows 10™ kernel cannot access VSM directly, this architecture can protect data in the VSM, even if the Widows 10™ kernel is compromised. Accordingly, encryption keys, user authentication data and other crucial information can be safely stored and managed in the VSM container.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1:
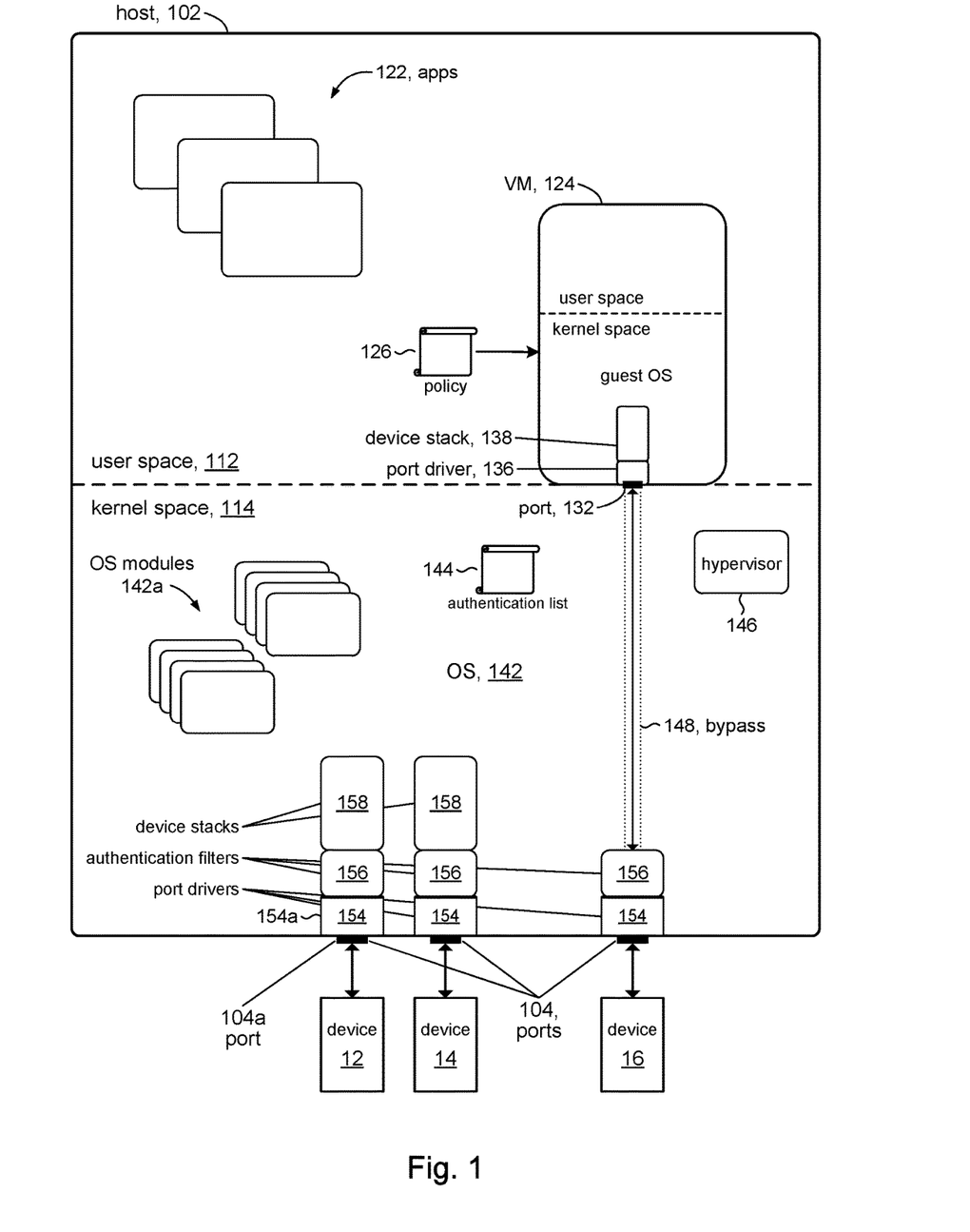
FIG. 1 illustrates a configuration of software in a computer system (host) in accordance with the present disclosure.

FIG. 1 illustrates a software configuration in a host 102 in accordance with the present disclosure. Details of the hardware configuration of host 102 are described below. The host 102 may be a computer system such as a laptop computer, a desktop computer, and the like. FIG. 1 shows that the software configuration of host 102 may comprise a user space 112 and a kernel space 114. The user space 112 generally refers to the portion of the memory (address) space of the host 102 that executes and stores data for various user applications 122 running on host 102.

In accordance with the present disclosure, the user space 112 may include an instantiation of a virtual machine (VM) 124. The VM 124 may include one or more virtual device ports 132. The VM 124 may include its own user space and an guest OS running in a kernel space of the VM 124. The guest OS may instantiate a virtual port driver 134 and a device stack 138. In some embodiments, a policy 126 may be provided to the VM 124. These aspects of the present disclosure are discussed below.

The kernel space 114 of host 102 generally refers to the portion of the memory space of the host 102 that is reserved for executing various operating system (OS) modules 142a that comprise an operating system 142 of the host 102; e.g., a privileged operating system kernel, kernel extensions, device drivers, and the like. In accordance with the present disclosure, the kernel 114 may include an authentication list 144, which is discussed in more detail below. Briefly, the authentication list 144 may be used to determine whether an external device is trusted or untrusted. The authentication list 144 may be periodically updated in order to remain current. In some embodiments, for example, a system administrator may periodically update the authentication list 144. In other embodiments, the host 102 may autonomously update the authentication list 144 from a trusted secure site, and so on.

In accordance with the present disclosure, the kernel 114 may include a hypervisor component 146 to manage one or more VMs 124. In some embodiments, the hypervisor component 146 may instantiate VMs 124 and boot up guest OSs on instantiated VMs 124. In some embodiments, the hypervisor component 146 may place the VMs 124 in various states of operation (e.g., sleep mode), including shutting down a VM 124.

FIG. 1 shows external devices 12, 14, 16 attached to the host 102 at respective device ports 104. In various embodiments, the external devices 12, 14, 16 may be USB devices, SCSI devices, FireWire devices, and so on. Though the remaining discussion may refer to a specific device type (e.g., USB), it will be understood that the present disclosure is applicable to other device types.

The kernel space 114 may include port drivers 154 configured to perform digital and/or analog signaling over respective device ports 104. In some embodiments, the device port 104 may be a physical, wired connector (e.g., USB connector, SCSI connector, etc.). The external device may physically plug into the device port 104. In other embodiments, the device port 104 may be wireless. For example, the device port 104 may include radio frequency (RF) circuitry to "connect" with an external device via a radio frequency link (e.g., a WiFi frequency, Bluetooth frequency, etc.). In some embodiments, the device port 104 may communicate via infrared (IR) signaling.

Each port driver 154 may be configured to communicate or otherwise interact with its respective device port 104 in accordance with the electrical and physical specifications of the data connections for the particular kind of external device that the device port 104 is configured for; e.g., USB, WiFi, SCSI, FireWire, etc. Merely to illustrate this point, suppose device port 104*a* is configured for a USB device. The corresponding port driver 154*a* would be configured in accordance with the specifications that define the USB interface. For example, the port driver 154*a* may interact with the USB device port 104*a* by sensing and asserting analog signals on the pins that comprise the USB interface (e.g., D+, D−, VBUS), and perform data communication with the external device 12 (a USB device) by sensing and asserting digital signals on the D+ and D− pins. Likewise, if the device port 104*a* is configured for a SCSI device, then the corresponding port driver 154*a* would be configured for operation with a SCSI interface, and so on with other device types.

In accordance with the present disclosure, the kernel space 114 may include authentication filters 156 that correspond to respective device ports 104. The authentication filters 156 may execute on top of respective port drivers 154. In some embodiments in accordance with the present disclosure, the authentication filter 156 may communicate with an external device to obtain information that identifies the external device. Further in accordance with the present disclosure, the authentication filter 156 may use the authentication list 144 to authenticate the external device. This aspect of the present disclosure is described in further detail below.

The kernel space 114 may include device stacks 158 to support the exchange of data and other interactions between an external device and the OS 142 of host 102. The device stack 158 may be logically envisioned as a set of device-specific data objects and programming objects that are "stacked" on top of each other and cooperate to enable interactions with the external device. For example, if the external device is a storage device, the interactions may include tasks such as handling I/O requests, file management, and the like. If the external device is a printer device, the interactions may include processing and managing print jobs; and so on with other kinds of external devices.

For discussion purposes, the external devices 12, 14 shown in FIG. 1 may represent examples of "trusted" devices. In some embodiments, device stacks 158 may be instantiated and built in the kernel space 114 for trusted external devices to enable and support interactions between the OS 142 and those trusted external devices. The external device 16 represents an example of an "untrusted" device. In accordance with the present disclosure, interactions with untrusted devices may be processed with a VM 124 that is "connected" to the external device 16 via a bypass 148.

Figure 2:
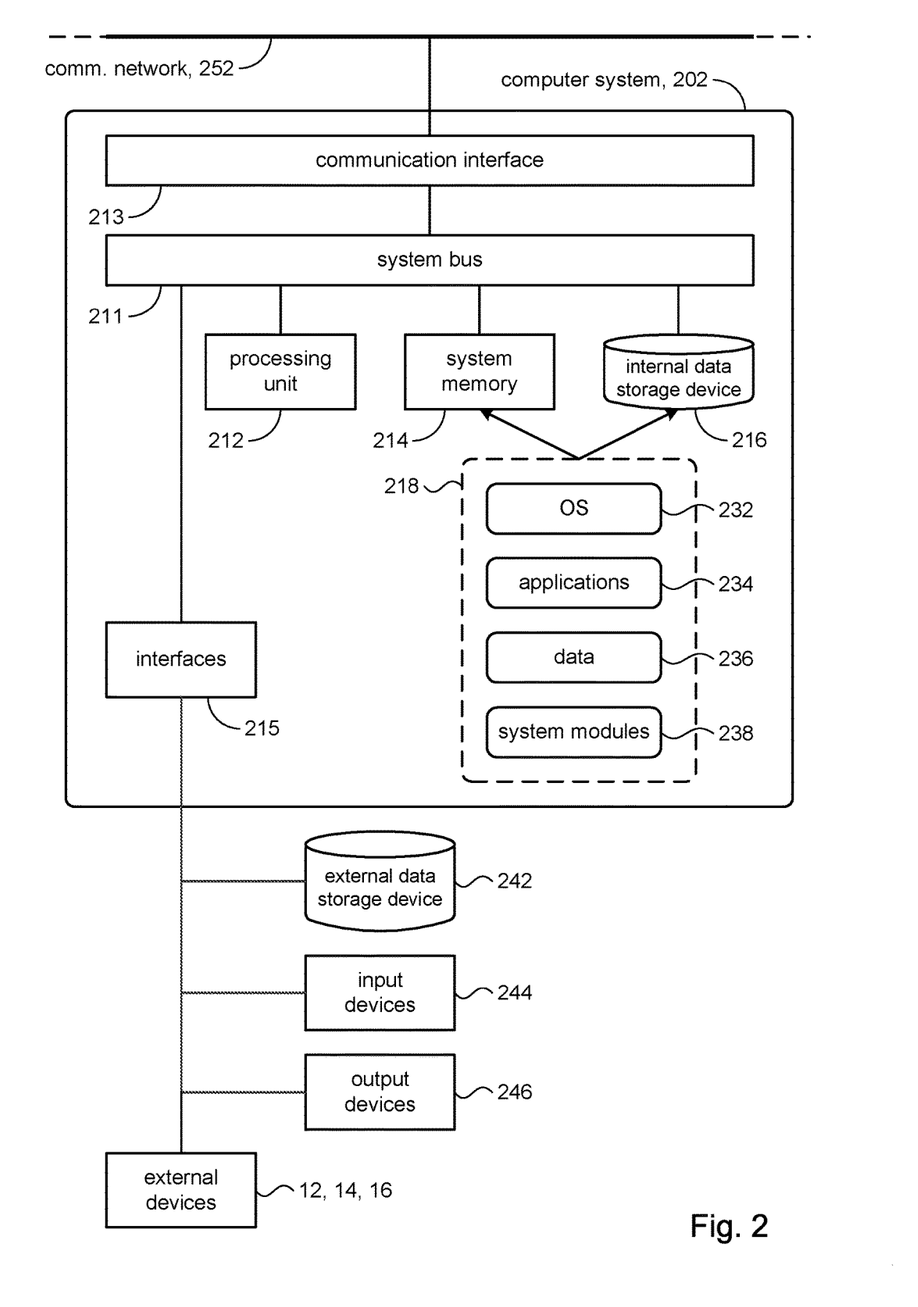
FIG. 2 is an example of a computer system and its components in accordance with the present disclosure.

Referring to FIG. 2, an illustrative implementation of host 102 may include a computer system 202 having a processing unit 212, a system memory 214, and a system bus 211. The system bus 211 may connect various system components including, but not limited to, the processing unit 212, the system memory 214, an internal data storage device 216, and a communication interface 213.

In some embodiments, the processing unit 212 may be a single-processor configuration. In other embodiments, the processing unit 212 may comprise a multi-processor architecture. The system memory 214 may include read-only memory (ROM) and random access memory (RAM). The internal data storage device 216 may be an internal hard disk drive (HDD), a magnetic floppy disk drive (FDD, e.g., to read from or write to a removable diskette), an optical disk drive (e.g., for reading a CD-ROM disk, or to read from or write to other high capacity optical media such as the DVD, and so on).

The internal data storage device 216 and its associated non-transitory computer-readable storage media may provide nonvolatile storage for data, data structures, computer-executable instructions, and so forth. Although the description of computer-readable media above refers to an HDD, removable magnetic diskette, and removable optical media such as a CD or DVD, it is noted that other types of media which are readable by a computer, such as zip drives, magnetic cassettes, flash memory cards, cartridges, and the like, may also be used. In addition, any such media may contain computer-executable instructions for performing the methods disclosed herein.

The system memory 214 and/or the internal data storage device 216 may store various program and data modules 218, including for example, an OS 232 (e.g., OS 142, FIG. 1), one or more application programs 234 (e.g., applications 122), program data 236 (e.g., authentication list 144), and other program/system modules 238 (e.g., port drivers 154, authentication filters 156, etc.). In accordance with the present disclosure, for example, OS 142, which when executed may cause the computer system 202 to perform the various steps disclosed herein. An external data storage device 242 may be connected to the computer system 202.

Access to the computer system 202 may be provided by a suitable input device 244 (e.g., keyboard, mouse, touch pad, etc.) and a suitable output device 246, (e.g., display screen). In a configuration where the computer system 202 is a mobile device, input and output may be provided by a touch sensitive display.

The computer system 202 may operate in a networked environment using logical connections via wired and/or wireless communications to one or more remote computers (not shown) over a communication network 252. The communication network 252 may be a local area network (LAN) and/or larger networks, such as a wide area network (WAN).

Figure 3:
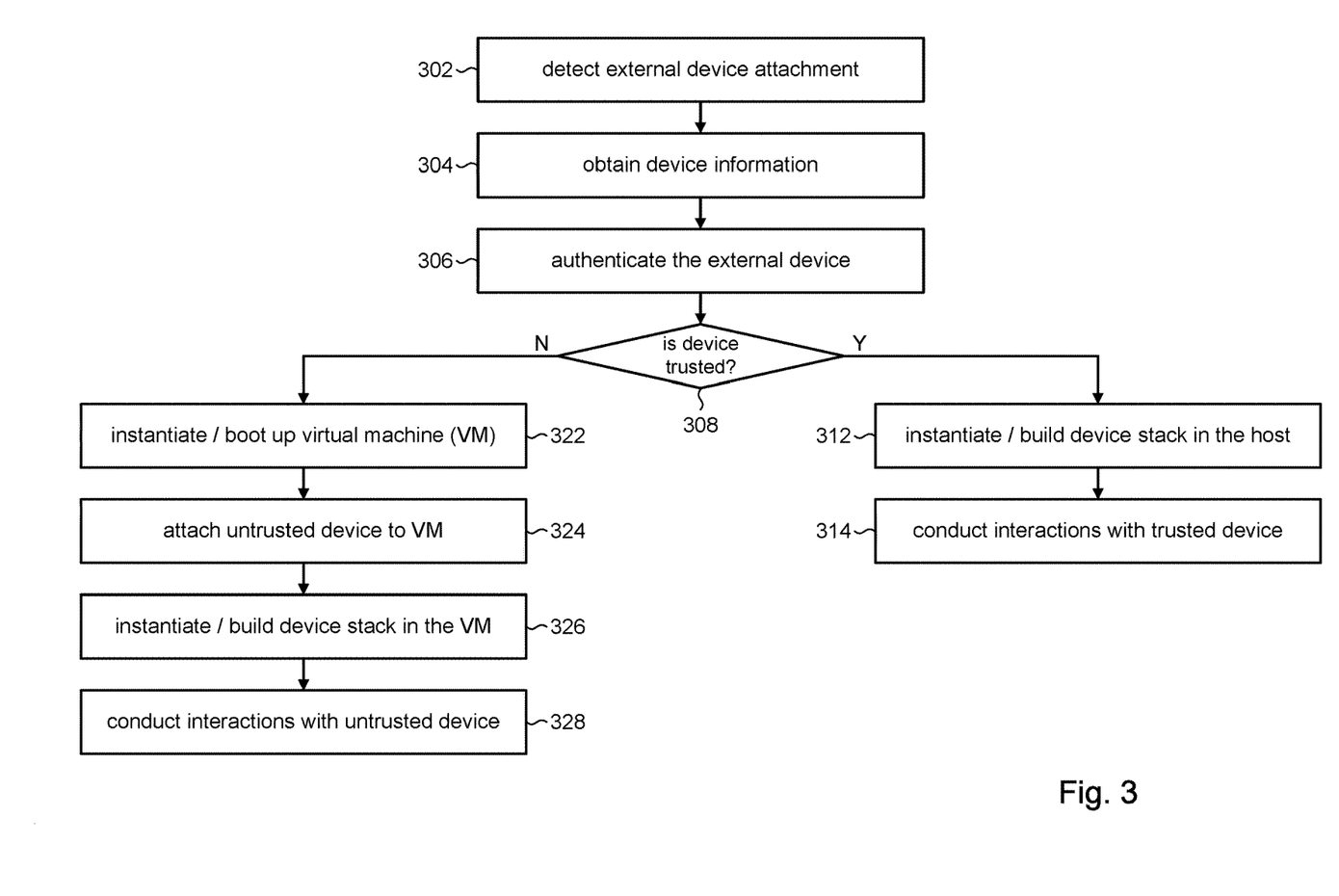
FIG. 3 illustrates an example of process in a computer system in accordance with the present disclosure.
Figure 3A:
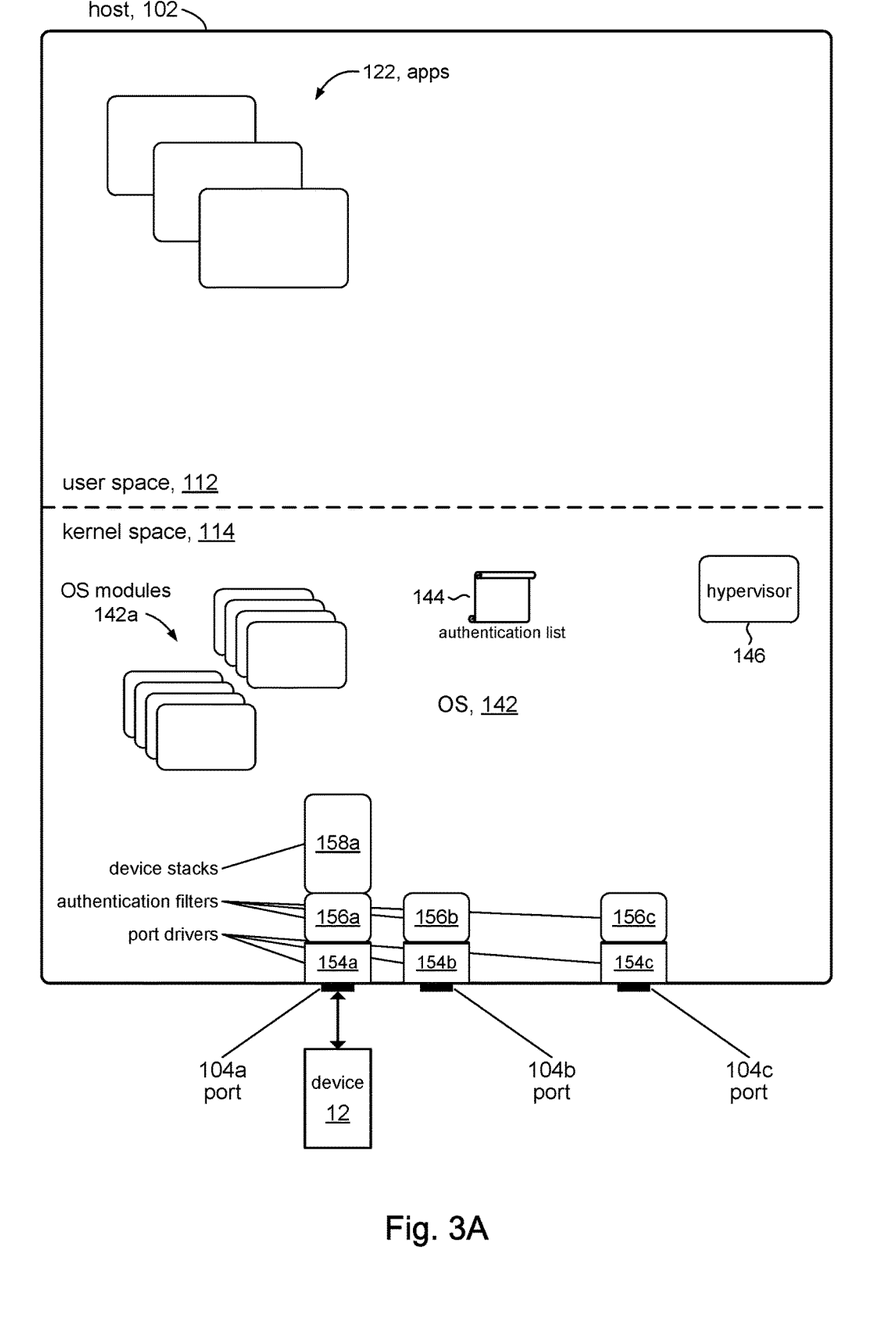
FIG. 3A represents an example of an initial state of a computer system in connection with the process shown in FIG. 3.

Referring to FIG. 3 and FIGS. 3A-3E, operation of host 102 in accordance with the present disclosure may be explained in terms of processing in the OS 142. FIG. 3A illustrates an initial state of host 102 for discussion purposes. The figure shows an external device 12 connected to the host 102 at device port 104*a*. The figure further shows that port driver 154*a* and authentication filter 156*a* are associated with device port 104*a*. Device stack 158*a* is associated with the external device 12. FIG. 3A further shows that port drivers 154*b* and 154*c* may "listen" to respective device ports 104b, 104c for device attachment. Authentication filters 156b, 156c are associated with respective port drivers 154b, 154c.

Figure 3B:
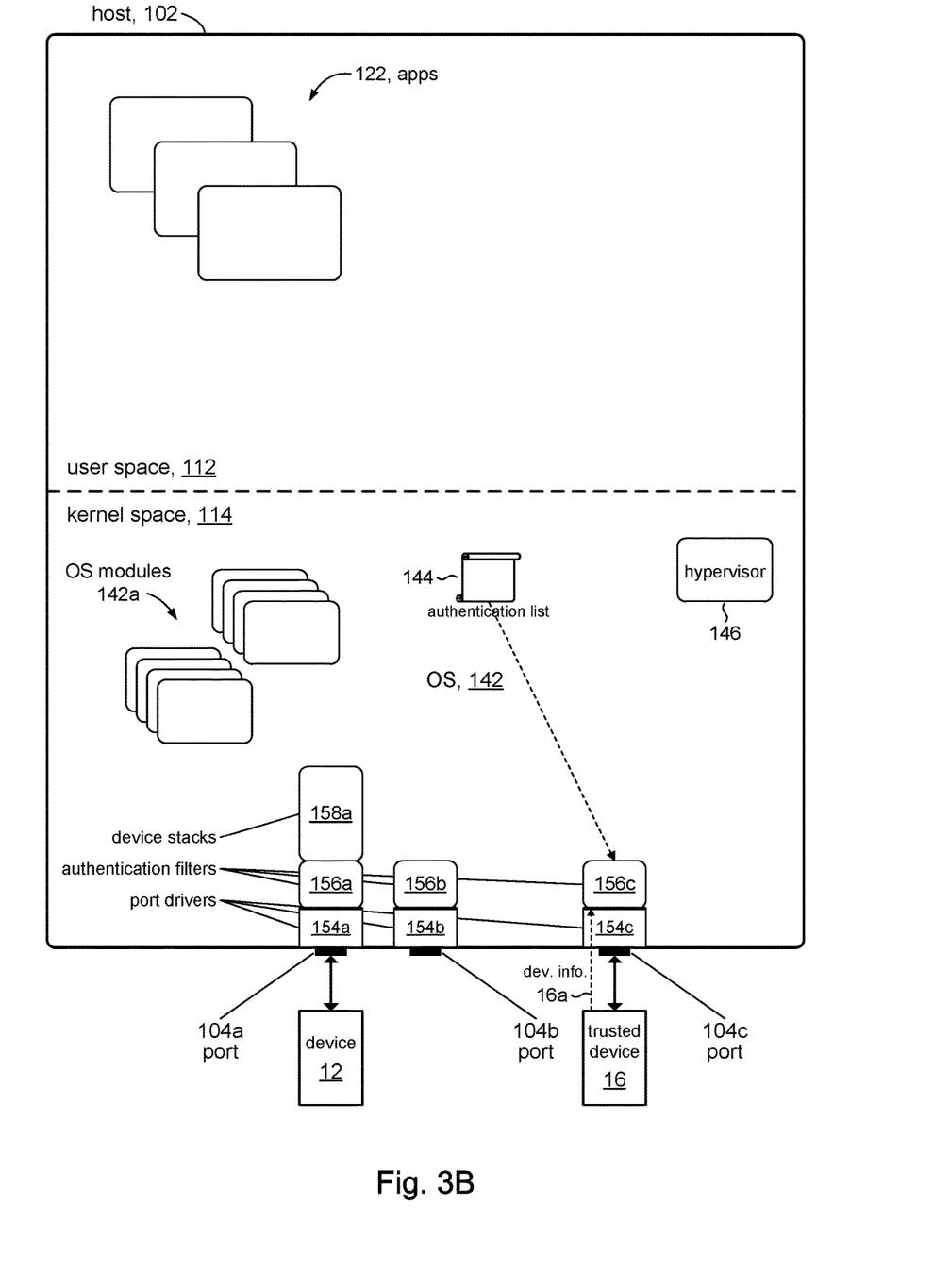
FIG. 3B represents an example of device attachment to a computer system in connection with the process shown in FIG. 3.

At block 302, when an external device 16 is attached to or otherwise connects to the host machine 102 at device port 104c, the OS 142 may detect the device attachment event. FIG. 3B illustrates a configuration in host 102 when external device 16 is attached. For example, the device port 104c may include circuitry that monitors interface pins for certain signals, such as voltage levels. In wireless embodiments, the device port 104c may include RF circuitry that can detect certain signaling in the appropriate RF frequency bands, and so on. The port driver 154c may monitor (listen to) the device port 104c and signal the OS 142 when the device port 104c signals to the port driver 154c that a device attachment is detected. For example, the port driver 154c may raise an interrupt to invoke an interrupt handler in the OS 142. In accordance with the present disclosure, the authentication filter 156c may be invoked in response to the device attachment. For example, the authentication filter 156c may be invoked by the interrupt handler.

At block 304, the authentication filter 156c may obtain device information 16a (FIG. 3B) associated with the external device 16. In some embodiments, for example, the authentication filter 156c may interrogate the external device 16 and obtain a product identifier (PID) that identifies the external device 16. The device information 16a may include a vendor identifier (VID) in addition to the PID. In other embodiments, the device information 16a may comprise other identifying information in addition to or instead of the PID and VID.

At block 306, the authentication filter 156c may authenticate the external device 16 using the device information 16a obtained from the external device 16. In some embodiments, for example, the authentication filter 156c may access the authentication list 144 (FIG. 3B) to determine whether or not to authenticate the external device 16. For example, the authentication list 144 may be a blacklist of known malicious devices. The blacklist may include PIDs and VIDs of known malicious devices. If the PID/VID obtained from the external device 16 is found in the blacklist, then the external device 16 may be deemed to be a malicious device and designated as "untrusted." If the PID/VID is not found in the blacklist, the external device 16 may be deemed to be "trusted."

In other embodiments, the authentication list 144 may be a whitelist that enumerates known trusted devices. If the device information 16a (e.g., PID/VID) from the external device 16 appears in the whitelist, then the external device 16 may be designated as trusted; otherwise, the external device may be a malicious device or a potentially malicious device and can be deemed to be untrusted.

In still other embodiments (not shown), rather than maintaining a local copy of the authentication list 144, the OS 142 may access a trusted site separate from host 102 (e.g., a web site accessed over the Internet) in order to perform the authentication. More generally, the authentication filter 156c may use any suitable authentication method to authenticate the external device 16.

In some embodiments, the authentication filter 156c may authenticate the external device 16 using heuristics in addition to or instead of the authentication list 144. For example, if a keyboard is already attached to the host 102, and the external device 16 exposes a keyboard interface, that fact may be deemed suspicious, which may cause the external device 16 to be designated as untrusted. As another example, suppose the host 102 is configured to have only one hard disk drive. If the external device 16 exposes a hard disk drive interface, the authentication filter 156c heuristics may be configured to treat this as a suspicious device and designate external device 16 as untrusted.

Figure 3C:
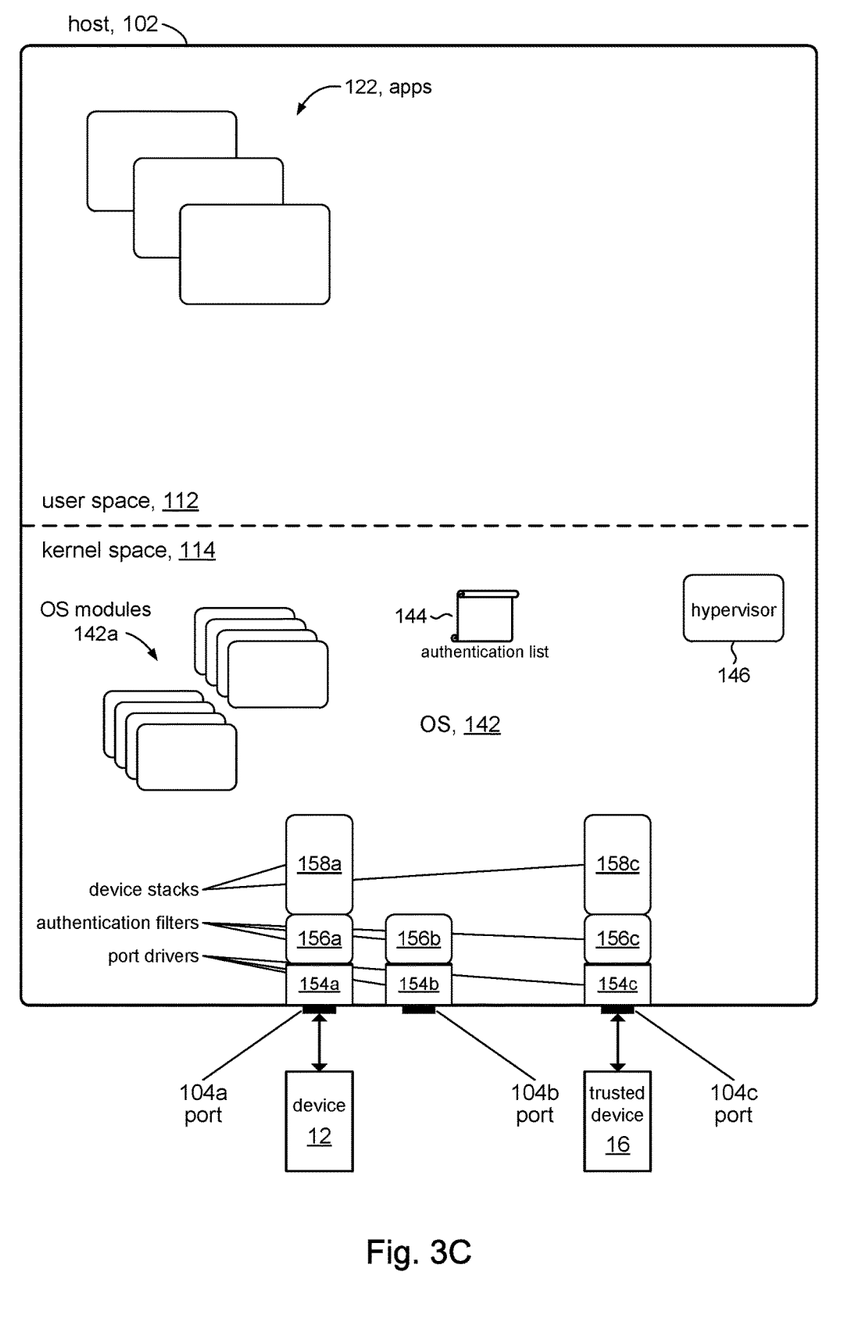
FIG. 3C illustrates a computer state when an attached device is deemed trusted in connection with the process shown in FIG. 3.

At block 308, if the external device 16 is deemed to be trusted (YES branch), then processing may proceed to block 312. FIG. 3C illustrates a configuration in host 102 in the case when external device 16 is a trusted device. In some embodiments, the OS 142 may instantiate and build, on top of the authentication filter 156c and port driver 154c, a device stack 158c that executes in the kernel space 114 of host 102. Since the external device 16 is deemed to be trusted, then in principle the kernel space 114 should not be at risk of an attack from the external device 16. Accordingly, at block 314, the OS 142 may conduct interactions with the external device 16 via device stack 158c.

Figure 4:
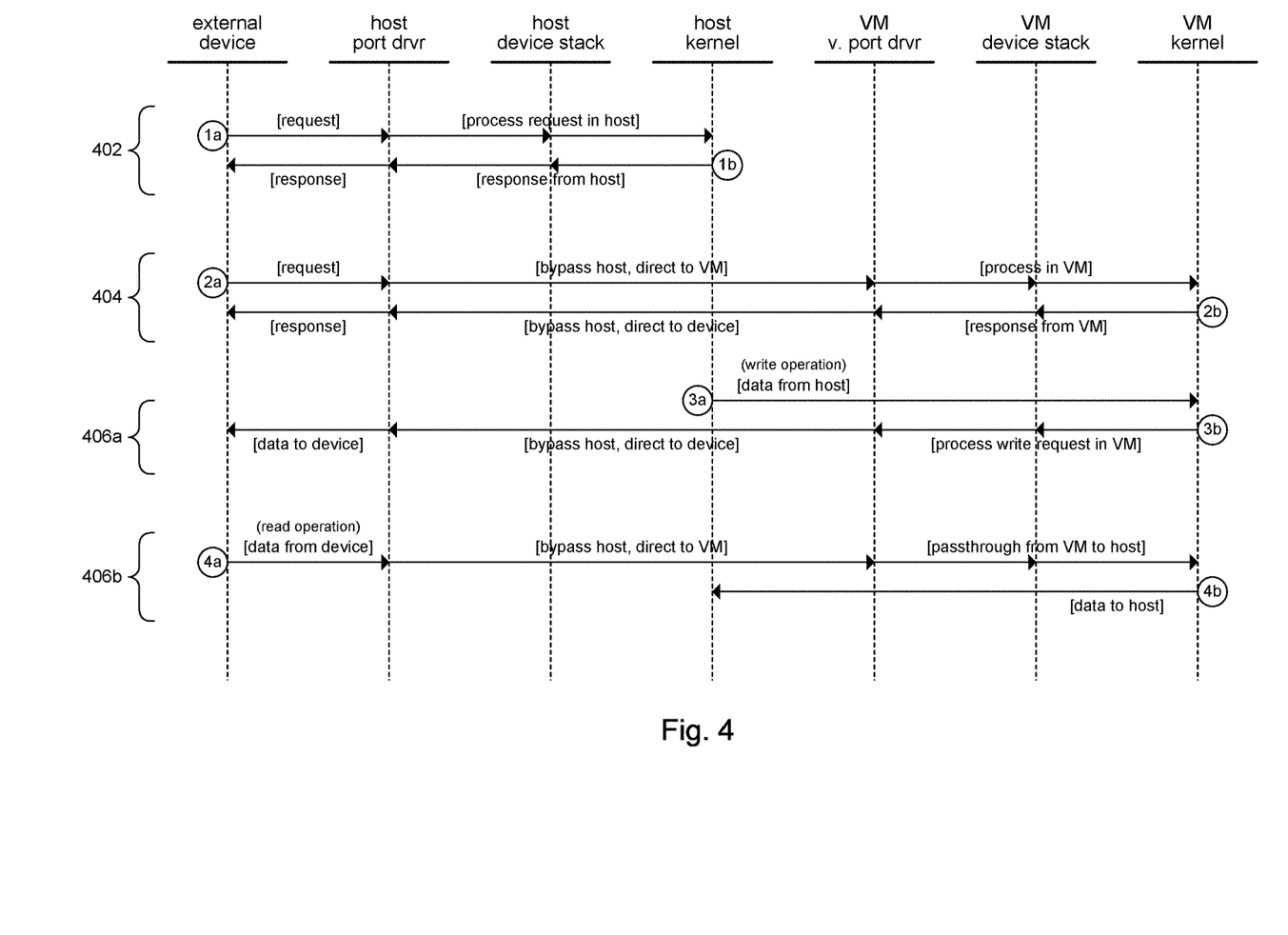
FIG. 4 illustrate communication sequences in accordance with the present disclosure.

Referring for a moment to FIGS. 3C and 4, interaction with a trusted device may be illustrated by communication sequence 402 shown in FIG. 4. Sequence path 1a, for example, shows that a request from the external device 16 may be received by the port driver 154c. The authentication filter 156c may operate in a pass-through mode, and since device stack 156c is built on top of the authentication filter 156c, the request is passed in to and processed by the device stack 156c. The request may work its way up the device stack 156c and processing may continue in the kernel space 114 of host 102. If a response is generated, the response may traverse along sequence path 1b in reverse order as shown in FIG. 4 from the kernel space 114 back to the external device 16.

Figure 3D:
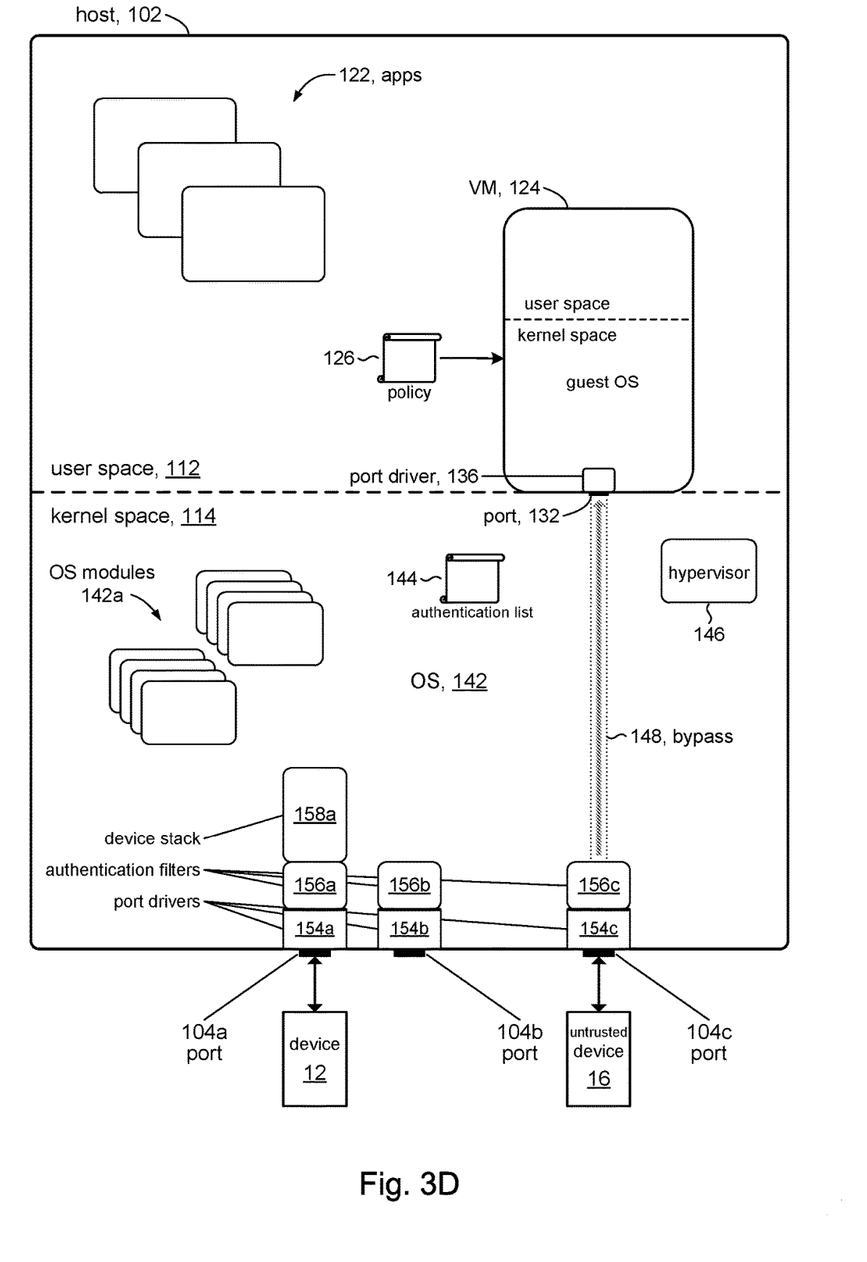
FIGS. 3D and 3E illustrate a computer state when an attached device is deemed untrusted in connection with the process shown in FIG. 3.
Figure 3E:
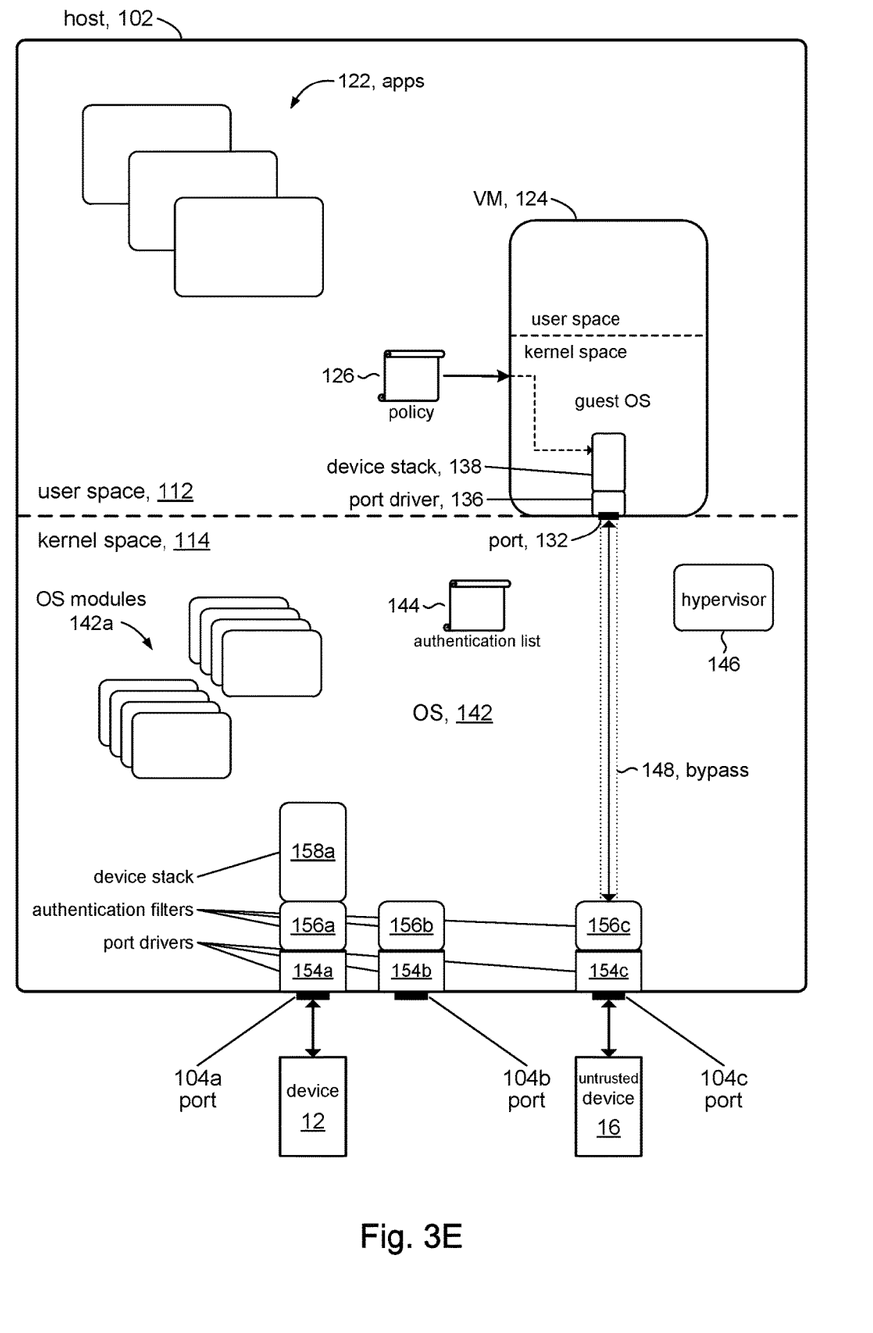

Returning to FIG. 3 at block 308, if the external device 16 is deemed to be untrusted (NO branch), then processing may proceed to block 322. FIGS. 3D and 3E illustrate a configuration in host 102 when the external device 16 is deemed to be an untrusted device. In accordance with the present disclosure, the OS 142 does not instantiate a device stack on top of the authentication filter 156c and port driver 154c. Instead, the OS 142 may instantiate a VM 124, as shown in FIG. 3D. In some embodiments, for example, the OS 142 may invoke the hypervisor component 146 to instantiate a VM 124 and boot up the VM 124 with a guest OS. The VM 124 may include a virtual port driver 134 that listens to the virtual device port 132 for a device attachment event. In various embodiments, the guest OS in VM 124 may be the same as or different from OS 142 in host 102. In some embodiments, the VM 124 may already be instantiated (and booted up), but is otherwise dormant (e.g., in sleep mode). Accordingly, the OS 142 may invoke the hypervisor component 146 to wake up the dormant VM 124. In some embodiments, a VM 124 may be instantiated for each untrusted device. In other embodiments, one VM 124 may be instantiated to process interactions with several untrusted devices.

At block 324, the hypervisor component 146 may coordinate with the authentication filter 156a to perform a virtual device attachment of the (untrusted) external device 16 to the virtual device port 132 of VM 124. This is action is depicted in FIG. 3D. A bypass 148 may be established between authentication filter 156a and the virtual device port 132 in VM 124. The bypass 148 is a logical representation of a connection between the authentication filter 156a and the virtual device port 132 and serves to indicate that data passes directly between the external device 16 and the VM 124 thus "bypassing" the kernel space 114 of host 102.

At block 326, the virtual port driver 134 in the VM 124 may detect the attachment event. In response, the guest OS executing in VM 124 may instantiate and build device stack 138 on top of the virtual port driver 134 (FIG. 3E) to interact with the external device 16. In various embodiments, the device stack 138 in VM 124 may be the same as or different from a device stack 158c (FIG. 3C) that would be instantiated in host 102 if the external device 16 was trusted.

At block 328, the VM 124 may conduct interactions with external device 16 via the device stack 138.

Referring for moment to FIGS. 3E and 4, interaction with an untrusted external device 16 in accordance with the present disclosure may be illustrated by communication sequence 404 shown in FIG. 4. Sequence path 2a, for example, shows an example of a request that originates from the untrusted external device 16. The request may be received by the port driver 154c. The authentication filter 156c may pass the request directly (e.g., via bypass 148) to the VM 124 for processing. The request is provided to the virtual device port 132 where the virtual port driver 134 passes the request to device stack 138 for processing. The request may work its way up the device stack 138 for further processing by the guest OS in the kernel space of VM 124. The VM 124 may ignore the request, perform the request, log the request, and so on. If the VM 124 generates a response, the response may traverse along sequence path 2b back to the external device 16. Thus, if the request is an attack (e.g., a keyboard injection of the request "cd/; rm *"), sequence 2a shows that the attack bypasses the host 102 and so the host 102 would not be susceptible to the attack. Since the VM 124 can be configured with "dummy" information, the attack on the VM 124 is rendered harmless.

In some embodiments, a policy 126 may be used to determine the nature of the interaction between the VM 124 and the untrusted external device. In some embodiments, for example, the VM 124 may use the policy 126 to decide whether and what kind of device stack 138 to instantiate. In other embodiments, the device stack 138 itself may use the policy 126 to guide its interaction with the untrusted external device 16.

In some embodiments, the policy 126 may restrict all interactions with the untrusted external device 16 to be processed only within the VM 124. This may be suitable, for example, if the external device (e.g., a USB device) appears as a keyboard. Keystroke attacks from the external device would be limited to the VM 124. Communication sequence 404 in FIG. 4 illustrates an example of this form of interaction.

Figure 5:
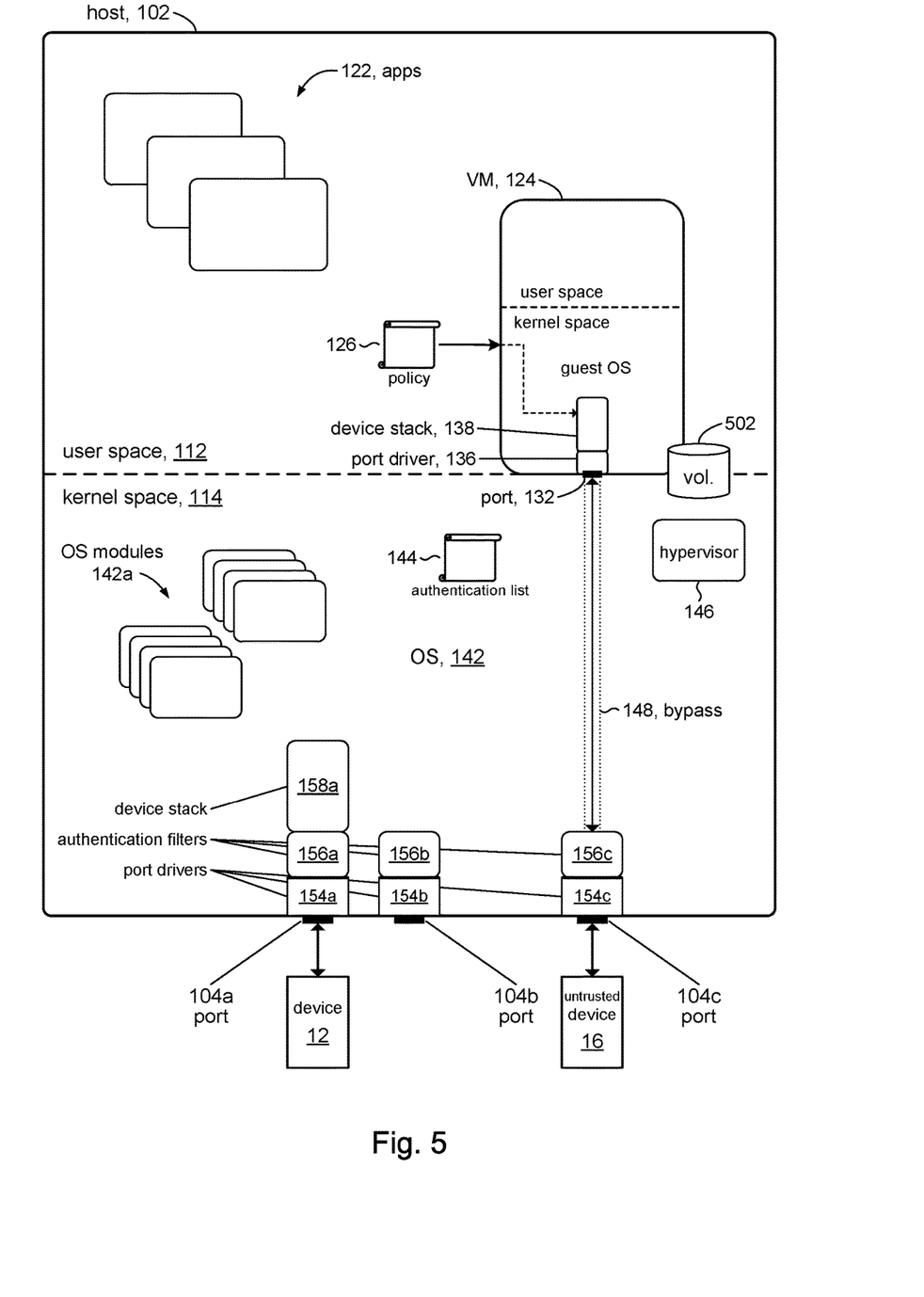
FIG. 5 illustrate a computer state for an untrusted device in accordance with some embodiments of the present disclosure.

In other embodiments, the policy 126 may allow certain interactions to occur in the kernel space 114 of the host 102, in addition to the kernel space of the VM 124. For example, if the external device 16 is a USB storage device that cannot be authenticated (e.g., due to an unrecognized PID/VID), the policy 126 may still allow the external device 16 to be accessed by a user on the host 102 as a storage device. Referring to FIG. 5, for example, the VM 124 may mount the external device 16 as a shared virtual volume 502 that can be accessed by a user in the host 102.

The communication sequence 406a in FIG. 4 represents an example of an interaction with the external device 16 that includes the host 102, where the external device 16 acts as a storage device. The interaction represents a write operation. For example, suppose a user on host 102 performs a write operation on the shared virtual volume 502. The write operation can be processed in the kernel space 114 of the host 102. The sequence path 3a shows that the write operation may result in write data being sent from the kernel space 114 of the host 102 to the kernel space of the VM 124. The sequence path 3b shows that the write data may be processed in the VM 124 and passed down the device stack 138 to the virtual port driver 134, and directly to the external device 16 (via bypass 148 to the authentication filter 156c/port driver 154c).

The communication sequence 406b in FIG. 4 represents an example of an interaction with the external device 16 involving a read operation from the host 102. For example, when a user on host 102 performs a read operation on the shared virtual volume 502, the external device 16 may provide data to the host 102. The sequence path 4a shows that external device 16 may send the data to the port driver 154c/authentication filter 156c in the host 102 and then directly to the virtual port 132 of VM 124, bypassing the kernel 114 of host 102. The data may then pass through the device stack 138 and into the kernel space of VM 124. In sequence path 4b, the VM 124 may then provide the data to the host 102, which ultimately reaches the user on host 102 who requested the data. As can be seen in sequence path 4a, input from the external device 16 bypasses the kernel 114 of host 102. Thus, if the external device 16 attempted an attack during a read operation the attack would land in the kernel space of the VM 124, thus avoiding a possibility of corruption to the kernel space 114 of host 102.

In accordance with the present disclosure, an untrusted external device that is physically attached to host 102 does not get a chance to interact with the host 102. Instead, the external device is virtually attached to VM 124 (e.g., via bypass 148), and all interactions with the external device can bypass host 102 and be processed by VM 124. The external device should be completely unaware that it is connected to VM 124 instead of host 102. More significantly, any attacks launched by the external device can be contained within the VM 124. For example, the VM 124 may contain dummy data (e.g., empty file system, dummy files, dummy configuration data, dummy databases, etc.), so that any attacks directed to the VM 124 (e.g., file modifications, file deletions, reconfigurations, etc.) would be harmless, since the VM 124 would contain no useful information. Likewise, any hacking attacks to obtain information from VM 124 would result in useless information. Any malware that attempts to corrupt or otherwise compromise the VM 124 would only damage the VM 124, not the host 102. Moreover, the VM 124 does not persist any data state or operating state. Thus, if an attack causes the VM 124 to crash, the hypervisor component 146 in the host 102 may simply instantiate another instance of the VM 124 with a clean guest OS.

In some embodiments, the VM 124 may be configured to allow a system administrator to monitor attacks on the VM 124. Data may be collected, and so on. In some embodiments, the VM 124 may take on an active role in the attacks. For example, the VM 124 may be configured to inject specific kinds of dummy data, or to make counterattacks, and so on. An administrator may log onto the VM 124 and interact with the attacks, and so on.

The various embodiments described herein may employ various computer-implemented operations involving data stored in computer systems. For example, these operations may require physical manipulation of physical quantities. Usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a first operating system (OS) executing on a computer system, the method comprising:
   detecting, in the first OS, attachment of an external device;
   determining, in the first OS, whether the external device is trusted or untrusted;
   when the external device is deemed to be trusted, then instantiating a first device stack in the first OS and using the first OS to conduct interactions with the external device via the first device stack; and
   when the external device is deemed to be untrusted, then instantiating a second device stack in a second OS executing on the computer system and using the second OS.

2. The method of claim 1, wherein the first OS is a host OS, the method further comprising, when the external device is deemed to be untrusted, instantiating a virtual machine on the computer system and executing the second OS as a guest OS on the virtual machine.

3. The method of claim 2, further comprising, when the external device is deemed to be untrusted, performing a virtual attachment of the external device to the virtual machine.

4. The method of claim 1, further comprising, when the external device is deemed to be untrusted, conducting all interactions with the external device using the second OS.

5. The method of claim 1, further comprising, when the external device is deemed to be untrusted, conducting some interactions with the external device using the second OS and conducting other interactions with the external device using the first OS.

6. The method of claim 5, wherein conducting other interactions with the external device using the first OS includes: the second OS receiving an interaction from the external device; and, in response, the second OS interacting with the first OS.

7. The method of claim 1, further comprising obtaining information from the external device in response to attachment of the external device, and authenticating the external device using the information obtained from the external device to determine whether the external device is trusted or untrusted.

8. The method of claim 7, wherein the information from the external device includes at least a device identifier or a vendor identifier from the external device.

9. The method of claim 7, wherein authenticating the external device includes comparing the information obtained from the external device with predetermined authentication information.

10. A non-transitory computer-readable storage medium having stored thereon computer executable instructions, which when executed by a computer device, cause the computer device to:
   detect, in a first OS that executes on the computer device, attachment of an external device;
   determine, in the first OS, whether the external device is trusted or untrusted;

instantiate a first device stack in the first OS and use the first OS to conduct interactions with the external device via the first device stack, when the external device is deemed to be trusted; and instantiate a second device stack in a second OS that executes on the computer and use the second OS to conduct interactions with the external device via the second device stack, when the external device is deemed to be untrusted.

11. The non-transitory computer-readable storage medium of claim 10, wherein the computer executable instructions, which when executed by a computer device, further cause the computer device to instantiate a virtual machine on the computer device and execute the second OS as a guest OS on the virtual machine, when the external device is deemed to be untrusted.

12. The non-transitory computer-readable storage medium of claim 11, wherein the computer executable instructions, which when executed by a computer device, further cause the computer device to perform a virtual attachment of the external device to the virtual machine.

13. The non-transitory computer-readable storage medium of claim 10, wherein the computer executable instructions, which when executed by a computer device, further cause the computer device to conduct all interactions with the external device using the second OS, when the external device is deemed to be untrusted.

14. The non-transitory computer-readable storage medium of claim 10, wherein the computer executable instructions, which when executed by a computer device, further cause the computer device to conduct some interactions with the external device using the second OS and conduct other interactions with the external device using the first OS, when the external device is deemed to be untrusted.

15. The non-transitory computer-readable storage medium of claim 10, wherein the computer executable instructions, which when executed by a computer device, further cause the computer device to obtain information from the external device in response to attachment of the external device, and authenticate the external device using the information obtained from the external device to determine whether the external device is trusted or untrusted.

16. An apparatus comprising:
a processor component comprising one or more computer processors; and
a non-transitory computer-readable storage medium comprising instructions for controlling the one or more computer processors to be operable to:
execute a first OS on the processor component;
detect, in the first OS, attachment of an external device;
determine, in the first OS, whether the external device is trusted or untrusted;
instantiate a first device stack in the first OS and use the first OS to conduct interactions with the external device via the first device stack, when the external device is deemed to be trusted; and
instantiate a second device stack in a second OS that executes on the processor component and use the second OS to conduct interactions with the external device via the second device stack, when the external device is deemed to be untrusted.

17. The apparatus of claim 16, wherein the computer instructions further control the processor component to instantiate a virtual machine and execute the second OS as a guest OS on the virtual machine, when the external device is deemed to be untrusted.

18. The apparatus of claim 16, wherein the computer instructions further control the processor component to conduct all interactions with the external device using the second OS, when the external device is deemed to be untrusted.

19. The apparatus of claim 16, wherein the computer instructions further control the processor component to conduct some interactions with the external device using the second OS and conduct other interactions with the external device using the first OS, when the external device is deemed to be untrusted.

20. The apparatus of claim 16, wherein the computer instructions further control the processor component to obtain information from the external device in response to attachment of the external device, and authenticate the external device using the information obtained from the external device to determine whether the external device is trusted or untrusted.

* * * * *